(12) United States Patent
Shipway et al.

(10) Patent No.: US 9,102,843 B2
(45) Date of Patent: Aug. 11, 2015

(54) CERAMIC INKJET INKS

(71) Applicants: Andy Shipway, Jerusalem (IL); Pazit Bar-Yossef, Modiin (IL)

(72) Inventors: Andy Shipway, Jerusalem (IL); Pazit Bar-Yossef, Modiin (IL)

(73) Assignee: DIP-TECH LTD., Kfar Saba (IL)

( * ) Notice: Subject to any disclaimer, the term of this patent is extended or adjusted under 35 U.S.C. 154(b) by 0 days.

(21) Appl. No.: 14/327,015

(22) Filed: Jul. 9, 2014

(65) Prior Publication Data

US 2015/0015638 A1 Jan. 15, 2015

Related U.S. Application Data

(60) Provisional application No. 61/846,213, filed on Jul. 15, 2013.

(51) Int. Cl.
*C09D 11/02* (2014.01)
*C09D 11/38* (2014.01)
*B41J 11/00* (2006.01)
*C09D 11/322* (2014.01)
*C09D 11/36* (2014.01)

(52) U.S. Cl.
CPC ............... *C09D 11/38* (2013.01); *B41J 11/002* (2013.01); *C09D 11/322* (2013.01); *C09D 11/36* (2013.01)

(58) Field of Classification Search
CPC ...... C09D 11/38; C09D 11/30; C09D 11/322; C09D 11/36
USPC .................. 106/31.65, 31.95, 31.05
See application file for complete search history.

(56) References Cited

U.S. PATENT DOCUMENTS

| | | | | |
|---|---|---|---|---|
| 5,743,946 A * | 4/1998 | Aoki et al. | ................ | 106/31.95 |
| 2008/0210122 A1* | 9/2008 | Magdassi et al. | .......... | 106/31.05 |
| 2009/0214840 A1* | 8/2009 | Eron et al. | ..................... | 428/210 |
| 2013/0220684 A1* | 8/2013 | Shipway | ........................ | 174/257 |
| 2014/0044894 A1* | 2/2014 | Shipway | ......................... | 428/29 |
| 2014/0186596 A1* | 7/2014 | Shipway | ...................... | 428/209 |

* cited by examiner

*Primary Examiner* — Veronica F Faison
(74) *Attorney, Agent, or Firm* — Jeffrey S. Melcher; Manelli Selter PLLC

(57) ABSTRACT

The current document discloses an inkjet ink that is characterized by exceptionally low sedimentation rate of glass frit and pigment particles. Practically, the ink reversibly gels upon extended standing, thus preventing sedimentation entirely.

17 Claims, 2 Drawing Sheets

CERAMIC INKJET INKS

TECHNOLOGY FIELD

Figure 1:
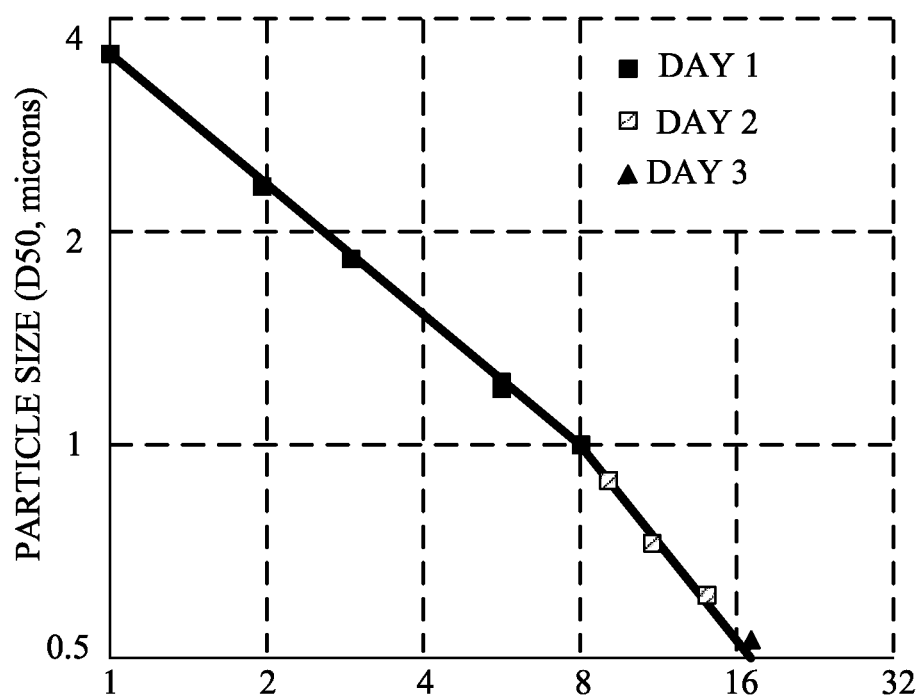

The present ink relates in general to inkjet inks and in particular to inks suitable for printing on glass and ceramic substrates.

BACKGROUND

Inkjet printing on glass or ceramic substrates has been known for some time. The printing process includes the distribution of ink containing inorganic pigment particles, solvents, sub-micron glass frit particles, and some other ink ingredients across a surface of a substrate. The sub-micron glass particles and inorganic pigments are later fused or fired into the substrate during the tempering or annealing process. The fusing of ink into the substrate supports the creation of vivid, durable designs that can last as long as the substrate itself.

The inks used for ceramic tile decoration have to satisfy several criteria. First, they must have the correct rheological and other properties such that they can be easy ejected from the nozzles of the inkjet printhead. The inks printed on a glass or ceramic substrate have to produce the desired final gloss, color and stability after application to the substrate and its further thermal processing and in particular firing.

Most of the currently used inks contain finely ground refractory inorganic pigments, synthetic nanoparticles, or soluble metal compounds. The formulation of inks for inkjet printing is challenging because not only must the ink maintain the desired final appearance, but it also has to maintain the physical properties that have been specially optimized for ink-jet printing. For example, the inks for printing on glass or ceramic surface have to utilize inorganic pigments, be sufficiently opaque, and may contain their own binder in the form of a glass frit. Because of these considerations they usually have a higher solids load then for example, ink for printing on paper. In order to avoid nozzle clogging, the pigment and glass frit particles are usually of sub-micron size. In the long term, such particle dispersions become not stable and tend to form sediments changing the density or the printed image and to some extent its color. Therefore, printers are required to include expensive and complex systems for constantly agitating and circulating the ink to prevent its separation.

Inkjet printing on glass or ceramic surfaces is an industrial glass and ceramics decoration process and maintenance of a stable ink and proper operating printer are paramount for successful penetration of the technology into the mainstream glass and ceramics industrial printing processes. In order to achieve optimal results the inkjet ink formulations have also to be matched to existing inkjet printheads. The industry would welcome improvements of the existing ink formulations as well as development of new inkjet ink formulations.

BRIEF SUMMARY

The current document discloses an inkjet ink that is characterized by an exceptionally low sedimentation rate of glass frit and pigment particles. Practically, the ink reversibly gels upon extended standing, thus preventing sedimentation entirely. The ink includes a solvent or a mix of solvents and a glass frit. The ink composition includes a mixture of two glass frits, which could be a bismuth based glass frit and a zinc additive glass frit. The mixture of the glass frits includes particles of two sizes; small size particles 0.3-0.8 microns and large particles with size of 0.8 microns and up to 2.0 microns. The density of the solvent and the glass frit are selected such that the difference between their densities is small. For example, the solvents used have density exceeding 1.10 g/cc. The solvent chosen also has a high viscosity as far as possible while allowing for suitable ink properties. The ratio between the pigment particles and glass frit particles would typically be at least 1:1 to 1:3.

The glass frit, and in particular the one resulting in small size particles of 0.3-0.8 microns, is milled in presence of a controlled flocculation dispersant. Such dispersant could be for example, BYK-220S. The small size glass frit particles with sized of 0.3-0.8 microns support increase in gloss, opacity, and/or pigment loading of the final ink layer. Small size glass frit particles and in particular zinc-based glass frit particle reduce three fold particles sedimentation rate. The ink also includes anti-settling additives such as BYK-410, BYK-415 and BYK-430.

BRIEF LIST OF FIGURES AND THEIR DESCRIPTION

FIG. 1 demonstrates the relation between the milling time and particle size.

Figure 2:
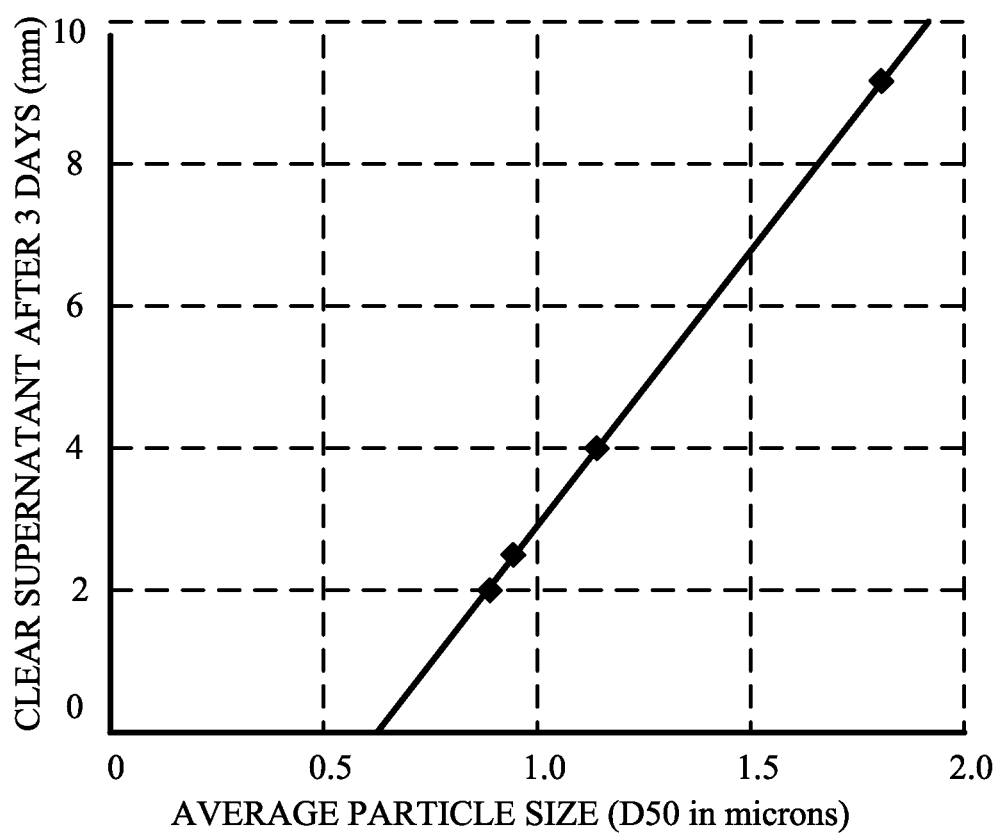

FIG. 2 is a plot that demonstrates a linear relationship between particle size and amount of settling.

DETAILED DESCRIPTION

As it was indicated above, inkjet inks for printing on glass and ceramics should have consistent properties within the required specification. Variation in any parameter could affect color intensity and definition (and therefore quality). One aspect to maintaining the density, viscosity and surface tension parameters of inks is keeping them at a constant temperature. This is desired in all cases, including pigment particle suspensions and organometallic compounds both for organic solvents and water. In some printers the entire ink reservoirs are kept at a constant temperature whereas in others just the small nozzle chambers or only the nozzles themselves. In some printers inks are continuously stirred and flow in a cycle from the main reservoir to the small chambers (and nozzles in some cases) and back to the main reservoir again. Operation of some printers includes a washing procedure and steps are scheduled, all without any break in the printing process. Therefore, stable inks with consistent properties are highly desirable.

Ceramic inkjet inks contain large amounts of particulate solids, including pigments and glass frit. These particulate components tend to aggregate and/or settle upon standing, leading to print inhomogeneity and even to system blockages. If settling or separation takes place during the ink drying process, then it can adversely affect the final product appearance, for example in terms of homogeneity or reproducibility. For these reasons, inkjet printers for inks containing particulate materials, such as inks for printing on glass or ceramic materials, generally include systems for ink circulation and agitation to prevent these problems. In addition, regular flushing of the print head could be used to ensure that stagnant ink does not cause problems in the print head. These requirements necessarily result in hardware and maintenance cost, as well as ink wastage. Therefore, the industry would welcome inks with low sedimentation rate that either reduce or remove the need for these systems.

Inkjet printing results in thin ink layers relative to other printing technologies such as screen-printing. Thicker ink layers can be produced by multiple passes over the same area, but this approach requires an investment in both (i) time and (ii) ink, as well as increasing the probability of ink bleed. Therefore, it is advantageous for inkjet inks to have a high pigment loading to provide high opacity in a thin ink layer. However, in order to provide adequate scratch resistance, pigment must be bound and encapsulated by frit. Sufficient frit must be used, and the total solids content of the ink must remain at a printable level. The binding effectiveness of the frit thus provides a limit on the amount of pigment that can be used in an ink. Therefore, inks supporting high pigment load are required by the industry.

A high loading of particles in the ink is preferred for the purpose of maximizing properties such as opacity and scratch-resistance. However, high particle loadings result in problems such as the clogging of fine channels and high viscosity. The use of low viscosity solvents is a typical way to keep the ink moving as freely and with as low a viscosity as possible.

Opacity relates to the ability to block light from passing into one side of the coating and out of the other. It is a key property of many coatings, for example where ink is used to mask unsightly or light-sensitive parts. Ceramic inkjet inks are often of low opacity by comparison with competing printing technologies, on account of the thin ink layer produced. As with pigment loading, low opacity can be addressed by resorting to thick ink layers, but this brings the drawbacks already discussed. Nevertheless, inks providing higher opacity of the printed layer would be preferred by the industry.

In addition, inks are often specified to have high gloss. Gloss is desirable not only from an aesthetic point of view, but also because it indicates a highly flat and non-porous surface, which is more resistant to staining, marking and chemical damage than matte surfaces are.

After ceramic ink has been applied to a substrate, the whole structure must be fired in order to sinter the ink and develop the final enamel. This process requires a certain combination of temperature and time, and the lower the requirements, the larger the number of applications that may be addressed. However, the development of frit formulations that have low firing requirements while also maintaining a high chemical stability, is extremely difficult, and so some compromise has to be made between the firing time/temperature and other properties.

Finally, ink production cost is a crucial issue for the successful development of economically viable inkjet ink. For ceramic inkjet inks containing significant quantities of finely-ground glass frit, this frit represents a major contribution—often the most major contribution—to the ink production cost. Therefore, a technology that allows the lowering of frit cost or content is highly desirable.

These and other problems could be resolved by selecting proper size glass frit particles, introduction of dispersants that control flocculation, using anti-sagging and anti-settling additives, introduction of ink ingredients reducing gelation upon standing, use of a relatively high viscosity vehicle, and minimization of density between liquid and solid ink ingredients mismatch.

Small Frit Particle Size

Glass frit is one of the major components of ceramic inks. The function of the glass frit is to bind pigment particles and to fuse with the substrate material to produce a strong and continuous structure. The frit particles must be small enough to provide visible homogeneity for the final fired ink (for example, smaller than 20 microns), and are generally milled no smaller than necessary size on account of the greatly increased cost incurred when milling particles to ever smaller sizes. Thus, frit particle size is in general determined by the requirements of the printing technology. In the case of screen-printing technology, where particles must only pass through the screen and settling is easily managed on account of the high ink viscosity, relatively high particle sizes are used—easily achieved e.g. by the cost-effective process of jet-milling. In inkjet inks however, it is necessary for particles to be sufficiently small to deposit by jetting through small orifices. Thus, particle sizes of less than 3 microns, and more often less than 1 micron are used. In order to keep these particles suspended in the ink during printer operation, circulation and agitation mechanisms are used. Therefore, the particle dispersions for such printers need only to be jettable, and not to be non-sedimenting.

Theory suggests that particle settling rate is proportional to particle size, and therefore smaller particles settle more slowly than larger ones. In addition, Brownian motion and internal dispersion structure dictate that below a certain particle size, settling may be inhibited completely. Such inhibition of settling can afford an advantage to printer construction in that agitation mechanisms will be unnecessary. All the same, very small frit sizes are avoided on account of the high cost of production and the high viscosity of such dispersions (viscosity rises significantly with decreasing particle size, and inkjet inks must have a low viscosity, usually in the range 5-50 cP).

Particle size in milled frits is generally measured by light scattering apparatus such as those developed and marketed by Malvern Instruments Ltd., Malvern WR14 1XZ United Kingdom or by Fritsch Laboratory Instruments GmbH, 55743 Idar-Oberstein Germany. These instruments make an indirect measurement based on the analysis of light scattering patterns while the particles are suspended in liquid vehicles. Other possibilities exist for particle size measurement, such as the individual measurement and counting of particles under SEM examination. Larger particle sizes can be determined by sieving. Milling produces a particle size and shape distribution rather than a population of particles with identical size and shape. However, in the field of inkjet inks, the term "particle size" is commonly understood to mean the average size of the particles as reported by a light scattering instrument. For the purposes of the present work, a Frisch Analysette 22 instrument is used, employing a Fraunhofer analysis, and the average particle size is reported as the D50 (the median particle diameter by mass; MMD). For the suspensions discussed, the D50 typically varies insignificantly from the D(4,3), which is another widely used definition of average particle size.

The present disclosed involves the milling of frit particles to a much smaller size than is typically used in ceramic inkjet inks, specifically to an average size in the range 0.3-0.8 microns. As well as the inhibition of settling, this particle size provides unexpected advantages in terms of the gloss, opacity, and pigment loading in inks, which in turn allow lower cost (because of reduced frit usage) and the possibility of improved printing (for example by allowing reduced wet ink thickness or lower total particle content).

According to the disclosure, frit milled to a very small particle size imparts gloss and opacity to an ink, while also reducing the total frit content required. A balance of frit milling cost and ink properties could therefore be found by including two frit sizes into an ink: a larger particle size frit, for example 1.5 to 2.0 or more micron particles, that provides most of the required properties, together with a smaller particle size frit of 0.3-0.8 microns that provides such property as gloss. A combination of frit sizes may even impart additional advantages. While an ink containing only one frit size will dry to form a pre-fired layer that contains small voids between the packed particles, the addition of a small amount of smaller particles will allow some of the voids to be filled, resulting in a denser dry layer and consequently an ink that can be fired more easily, at a lower time/temperature combination. The ratio of frits may be tuned to provide the desired mixture for a specific application. For example, a ratio of larger particle size frit to smaller particle size frit of approximately 10:1 supports the formation of a dense, fast firing ink layer, where a ratio of 2:1 supports a higher gloss and opacity fired ink layer.

Size and Selection of Pigment and Other Additive Particles

Maximal resistance to settling of particles, pigment and other additive particles could also be enhanced by milling them to a small size with the use of a controlled flocculation dispersant. For many pigments this is easily accomplished since they are easy milled to small sizes, or even sold as standard at small particle sizes. For example, titanium dioxide is typically supplied at a particle size of around 250 nm, since at this size its ability to scatter visible light is maximized.

A variety of pigments have been tested and probably more could be used with the current ink to provide the ink with a desired color. For example, Copper Chromite Black Spinel commercially available from Shepherd Color Company, Cincinnati Ohio 45246 USA under trade names BK 430 and BK 30C965; Cobalt-aluminate-blue-spinel commercially available from Fredcolors 08211 Barcelona, Spain under trade names Inorplast Blue DC-1500 or Blue 385 commercially available from Shepherd Color Company; Oxides of Nickel, Cobalt and Titanium commercially available from Shepherd Color Company under trade name Green 5 or Oxides of Nickel, Cobalt, Titanium, and Zinc commercially available from BASF Chemical Company Ludwigshafen Germany; nickel antimony titanium yellow rutile commercially available from Shepherd Color Company under trade names Yellow 10C112 and Yellow 10P110 or Nickel rutile pigments available from Heubach GmbH 38685 Langelsheim Germany under the trade name Heucodur Yellow G 9064; Titanium Dioxide available from a large number of vendors and other pigments.

It should be noted that some inks could use certain large particle size pigments or functional particles. For example, some pigments lose their color or intensity of the color at small particle sizes. Inks containing such particles may not be possible to formulate without settling, requiring a printer with constant agitation of the ink. However, the use of aspects of this disclosure can still be relevant to such inks, for example for the provision of gloss and/or opacity, or to reduce the rate of settling to more manageable levels.

Controlled Flocculation Dispersants

Inkjet inks require low viscosity, high filterability, and jettability through small apertures. As such, conventional wisdom dictates that particles should be as well separated as possible and any aggregation or flocculation should be inhibited. This is particularly true since aggregation is known to be a common cause of settling and loss of gloss in coatings.

The current disclosure employs the use of "controlled flocculation" dispersants such as a low molecular weight unsaturated acidic polycarboxylic acid polyester with a polysiloxane copolymer commercially available from BYK-Chemie GmbH 46483 Wesel Germany under the name BYK-220S; a low molecular weight unsaturated acidic polycarboxylic acid polyester, commercially available from BYK-Chemie GmbH under the name of BYKUMEN, a partial amide and alkylammonium salt of a low molecular weight unsaturated polycarboxylic, commercially available from BYK-Chemie GmbH under the name of LACTIMON; a low molecular weight unsaturated polycarboxylic acid polymer commercially available from BYK-Chemie GmbH under the name of BYK-P-104; and an alkyl ammonium salt of a polycarboxylic acid commercially available from BYK-Chemie GmbH under the name of ANTI-TERRA-203/4/5. These dispersants cause the formation of weak networks between suspended particles. When utilized together with small frit particle size, the use of these dispersants was found to result in very slowly settling inks that unexpectedly retain low viscosity at working shear rates, together with ink filterability and gloss in the final printed product.

In cases where the minimization of settling is not a major concern, the use of controlled flocculation dispersants could be substituted by use of traditional dispersants. The milling of frit to particle size 0.3-0.8 microns in "traditional" deflocculating dispersants (for example, a family of dispersants commercially available under the trade name of BYKJET, or other DISPERBYK family dispersants such as DISPERBYK 106, 110, 116, 145, 180, etc.) provides frit that could be used alone or in combination with other frit batches to e.g. increase gloss, pigment loading or opacity.

Anti-Sagging and Anti-Settling Additives

In the case of inks that have otherwise low viscosity, anti-sagging and/or anti-settling additives such as solution of a modified urea commercially available from BYK-Chemie GmbH under trade names BYK-410, BYK-415 and BYK-430, could be used to improve the resistance of an ink to pigment and frit settling at the expanse of a raised viscosity. Inorganic anti-settling additives could also be utilized. Such additives can also help to reduce bleed during printing, although they tend to increase viscosity so may only be used in limited quantities.

Minimization of Density Mismatch Between the Solvents and Glass Frit

With all other variables constant, the rate of settling in an ideal dispersion is proportional to the difference in density between the liquid and the suspended solid. In typical frits for ceramic inks, bismuth oxide glass is used as a primary additive to achieve suitable thermo-physical and chemical properties. An alternative option to use zinc oxide in place of bismuth is less preferred on account of the lower chemical resistance that inks based on it can achieve.

However, the density of bismuth oxide glass frit is in the range of 5.6 to 7.5 g/cc while the density of zinc oxide is 2.6 to 3.3 g/cc. Thus, glass frits based on the zinc additive result in a lower density and therefore they sediment significantly more slowly. In this disclosure, the inhibition of sedimentation is found to bring advantages to ceramic inks, and therefore the use of zinc-based frits becomes unexpectedly more preferred, having a previously unconsidered density advantage over bismuth-based frits.

In addition, the density mismatch between liquid and solid can be minimized by the choice of a high density solvent system. Inkjet inks are typically based on solvents such as glycol ethers (density 0.9-1.0 g/cc) or hydrocarbons (density 0.7-1.0 g/cc). High density solvents could be employed as part of the solvent system to improve the settling rate. Examples include sulfur-containing solvents (e.g. sulfolane, density 1.26); chlorinated solvents (e.g. pentachlorobenzene, density 1.8); carbonates such as propylene carbonate (density 1.21 g/cc), and other high density solvents such as dimethyl malonate (density 1.15 g/cc). Solutes may also be added to increase the liquid vehicle density. (Generally, low sedimentation rates were achieved for inks wherein the density of the glass frit based on the zinc additive related to the density of the solvent at least as 3.3 to 1.0 or event better as 2.6 to 1.0.)

Use of High Viscosity Vehicle

The rate of settling of particles in a suspension is largely proportional to the viscosity of the suspending vehicle. Since the viscosity of the ink as a whole depends not only on the viscosity of the vehicle but also on the interactions of the particles, it can be possible to engineer inks with unusually high vehicle viscosity, particularly by the use of solvents that may normally be overlooked. Most solvents used in the formulation of inkjet inks have viscosity in the range 0.5-5.0 cP, but inks may be jettable at up to 25 cP or even more.

The ceramic mixture (+/−)-2,2-dimethyl-4-hydroxymethyl-1,3-dioxolane commercially available from Rhodia 69457 Lion France under the trade name Augeo SL 191, has a viscosity of ~11 cP. Ethylene glycol has a viscosity of ~16 cP, and Dowanol TPM has a viscosity of ~5.5 cP. These solvents can be used at up to 50 wt % in inks. Higher viscosity solvents such as propylene glycol (42 cP), cyclohexanol (41 cP), and diethylene glycol (36 cP), can be used at up to 20 wt %. Such use of high viscosity solvents, even in mixtures together with lower viscosity solvents, provides a high viscosity vehicle that impedes sedimentation. A suitable mixture including both a high viscosity solvent and a high density solvent may provide the most optimal vehicle.

Depending on the choice of frit and pigments, as well as other considerations such as printability, safety, and environmental concerns, solvent systems other than those mentioned above could also be used. For example, hydrocarbon/paraffin-based nonpolar solvents such as Isoparaffinic Hydrocarbon commercially available from Exxon Mobil Company Houston, Tex. 77079-1398 USA under the trade name Isopar M, may be utilized.

Gelation Upon Standing

Sedimentation may be completely avoided by the controlled gelation of an ink upon standing in the absence of agitation, particularly in the absence of syneresis, which is a process that reduces homogeneity. Therefore, ink that gels upon standing for extended periods while remaining fluid and of printable viscosity on the timescale of printing is desirable. Inks that are gelled with a very weak energy may be brought back to fluidity with minimal shaking, much less than is required to redisperse settled inks. The strategies of small particle size, controlled flocculation dispersants, and anti-sagging/anti-settling additives, are all conducive to the creation of inks that exhibit the desired behavior.

Ink Preparation Processes and Examples

Milling of Frit

A comparative example of a bismuth-borosilicate frit "JFC004" commercially available from Johnson Matthey Plc., London EC4A 4AB Great Britain was wet-milled by bead-milling at 65-70% concentration in Dipropylene Glycol Monomethyl ether (DPM) with 2% BYK-220S. Viscosity reduction and particle size reduction rate were both found to be more efficient with this controlled flocculation dispersant than with any tested non-flocculating dispersant. With other dispersants the particle size reduction rate slowed and the slurry thickened before an ultimate particle size of 0.8 microns was reached, but with this controlled flocculation dispersant, a particle size of 0.6 micron with median distribution of 50% was achieved. FIG. 1 demonstrates the relation between the milling time and particle size.

Decreased Settling Rate—Small Particle Size

Dispersions of "JFC004" bismuth-based frit in DPM were adjusted to a concentration of 50 wt % inorganic solids. A small sample in an about 20 mm diameter sample vial was examined over time, and the amount of settling of the suspended solid bulk was noted. The small particle size sample was found to settle much more slowly than the large particle size sample:

| Sample | Particle size (D50) | Settling (3 days) | Settling (7 days) |
| --- | --- | --- | --- |
| 42-125-02* | 0.58 microns | 1 mm | 1.5 mm |
| 42-125-04 | 0.85 microns | 2 mm | 4.5 mm |

*Ink sample numbers are numbers given by the authors of the present disclosure in course of the ink development process It should be noted that the very small initial apparent settling of ~1 mm may be the result of a syneresis-like process rather than true sedimentation. A 30% reduction in particle size (from 0.85 to 0.58 microns) resulted in 3× improvement in settling rate. This improvement is considerably more than could be expected from the ideal theory of dispersions (which would predict only a 30% improvement).

Decreased Settling Rate—Zinc Based Glass Frit

Dispersions of zinc-based and bismuth-based frits at similar particle sizes were adjusted to a concentration of 50 wt % inorganic solids in DPM. A small sample in an about 20 mm diameter sample vial was examined over time, and the amount of settling of the suspended solid bulk was noted. The sedimentation of the zinc-based frit, even at larger frit particles size was found to be considerably slower, practically negligible, than the bismuth-based fit. The authors of the disclosure assume that this phenomenon is mainly brought about by the lower density of the zinc-based frit:

| Sample | Basis | Particle size (D50) | Settling (3 days) | Settling (1 week) |
| --- | --- | --- | --- | --- |
| 42-113-04 | Zinc | 1.00 microns | 2 mm | 2.5 mm |
| 42-125-04 | Bismuth | 0.85 microns | 2 mm | 4.5 mm |

The zinc-based glass frit was milled in DPM over a long period of time, and samples were periodically taken. These samples were diluted to provide frit dispersions at a particle concentration of 50 wt %, and were left to stand for 3 days. After this time, the amount of settling was measured (in terms of the height of nominally particle-free solvent at the top of the mixture). FIG. 2 is a plot that demonstrates that a linear relationship found between particle size and amount of settling.

Extrapolation of the linear relationship unexpectedly finds that at a particle size of 0.6 microns or less, settling could be completely arrested.

It should be noted that a portion of the initial apparent settling may be the result of a syneresis process rather than true sedimentation (Syneresis is understood to be the extraction or expulsion of a liquid from a gel). The superiority of the zinc-based frit in settling resistance is even more marked than the data immediately suggests, since the zinc frit is milled to a larger particle size, which would be expected to settle more rapidly.

Decreased Settling Rate—Use of Controlled Flocculation Dispersants

Although several controlled flocculation dispersants were screened, some were found to be incompatible with the solvent used in the studies (DPM), and some were found to cause an unacceptably high viscosity. Studies therefore concentrated on the controlled flocculation dispersant BYK-220S, which was found to give by far the best viscosity reduction of the tested dispersants while also having good compatibility with DPM. The authors of the present disclosure do not exclude that other suitable controlled flocculation dispersants will be found.

The settling rate of zinc-based frit was measured with controlled flocculation dispersant BYK-220S compared to Disperbyk-145 (the best-performing non-flocculating dispersant found for the frit):

| Sample | Dispersant | Settling (3 days) | Settling (7 days) |
|---|---|---|---|
| 42-113-01 | BYK-220S (2%) | 1.5 mm | 2 mm |
| 42-113-04 | Disperbyk-145 (2%) | 2 mm | 2.5 mm |

Although the improvement is small, the settling rate is nonetheless decreased by the use of the controlled flocculation dispersant. It should be noted also that typical ceramic inkjet inks settle at a much faster rate, for example 7 mm in 3 days and 14 mm in 7 days.

In addition to the decreased settling rate observed with controlled flocculation pigments, an additional advantage is found. After sedimentation has occurred, the sediment formed under controlled flocculation is much more mobile and easily redispersed than the sediment formed with "traditional" non-flocculating dispersants.

Improved Opacity—Small Frit Particle Size

Analysis of frit milled to different sizes found that very small particle size frit gave an advantage of increased opacity. Frit dispersions were adjusted to 50 wt % inorganic solids, and drawn down to give 60 micron-thickness wet layers.

| Sample | Particle size (D50) | Opacity |
|---|---|---|
| 42-125-03 | 0.58 microns | 84% |
| 42-125-04 | 0.85 microns | 76% |

The sample created from frit with a 30% smaller particle size (0.58 microns vs 0.85 microns) resulted in more than 10% higher opacity. The authors of the present disclosure believe that the reason for this increase in opacity is the larger number and smaller size of the voids between packed particles in the dried ink layer. It is advantageous to use smaller frit particle size for the production of many inks, particularly those involving transparent pigments where opacity is required.

Improved Gloss and Opacity—White Ink Preparation

White inks were prepared using bismuth-based frit milled to different sizes, and otherwise identical formulations. Pigment loadings of 10.5 wt % and 14 wt % were used. The pigment used was titanium dioxide at 250 nm particle size. This pigment tends to product matte inks, particularly at higher pigment loadings. Samples of the inks were drawn down at 60 microns layer thickness, then these samples were dried and fired at 690 C to give a final enamel. Gloss and opacity were measured:

| Ink Sample | Frit size | Pigment | Gloss | Opacity |
|---|---|---|---|---|
| 45-34-1 | 0.58 microns | 10.5 wt % | 114 | 97% |
| 45-33-2 | 0.85 microns | 10.5 wt % | 72 | 94% |

For the samples containing 10.5% pigment, the smaller frit particle size resulted in ink with a much higher gloss and opacity than the larger particle size did. The reason for the improved opacity is not clear, but the difference found is sufficient to offer a noticeably superior ink.

| Ink Sample | Frit size | Pigment | Gloss |
|---|---|---|---|
| 45-34-02 | 0.58 microns | 14 wt % | 50 |
| 45-02-02 | 0.85 microns | 14 wt % | 20 |

For the samples containing 14% pigment, less gloss was found. All the same, the gloss achieved for the smaller frit particle size was 2.5 times higher than that obtained with the larger frit particle size.

These inks also exhibited light gelation after standing for 24 hours. This gelation was sufficient to prevent sedimentation indefinitely, but the ink reverted to a liquid state after light shaking.

Increased Pigment Loading and Decreased Frit Requirement—Black Ink Preparation

Black inks were prepared using bismuth-based frit milled to different sizes and small particle size pigment. The inks were prepared with a total particle content of 49 wt %, but different frit:pigment ratios. Samples of the inks were drawn down at 30 and 60 microns layer thickness, and then these samples were dried and fired at 690 C to give final enamel. For comparison purposes a commercially available ceramic inkjet ink with an identical pigment loading was tested as a reference point. Gloss and opacity were measured:

| Ink Sample | Frit size | Pigment | Gloss (60 µm) |
|---|---|---|---|
| 45-35-01 | 0.58 microns | 11.2% | 125 |
| 45-35-03 | 0.58 microns | 21 wt % | 118 |
| 45-36-02 | 0.85 microns | 21 wt % | 25 |

The 60 micron samples demonstrate the ability of the small particle size frit to produce enamel layers with high gloss, even at a very high pigment content. At a high pigment content, the larger frit particles do not provide any significant gloss, while the smaller frit particles still give very little reduction from the low pigment content ink. At 60 microns wet thickness, opacity is extremely high and was not measurable.

| Ink Sample | Frit size | Pigment | Gloss (30µ) | Opacity (30 µm) |
|---|---|---|---|---|
| 45-35-03 | 0.58 microns | 21 wt % | 91 | 99.5% |
| 45-35-01 | 0.58 microns | 11.2 wt % | 124 | 98.3% |
| CASS-0001* | ~0.9 microns | 11.2 wt % | 110 | 97.4% |

*This ink is commercially available from Dip-Tech Ltd., 44536 Kefar Sava Israel

In the 30-micron drawdown samples, opacity was measurable though very high. By eye, some light could be seen passing through the samples with 11.2% pigment, but no light transmission was visible for the sample with 21% pigment. The small frit particle size inks gave higher opacity than the commercial reference ink, even at the same pigment content. At the higher pigment content, opacity was even higher, with only a very small loss of gloss. Clearly an ink based on the small particle size frit could provide comparable gloss and opacity to the commercial ink in a much lower layer thickness—or alternatively higher gloss and opacity at the same layer thickness.

Mixture of Pigment Sizes

The commercial black ceramic inkjet ink CASS-0001 (Available from Dip-Tech Ltd. Israel), which contains a frit in the range 0.8-2.0 microns, was modified by adding 3.5% of a bismuth borosilicate frit milled to 0.7 microns. The resulting ink contained a mixture of frit sizes, with the ratio of smaller to larger frits being in the range of 1:7-1:15. The modified ink and the original CASS-0001 ink were compared after firing in a roller furnace at 610 C and 620 C for 105 seconds. The ink with the mixture of frit sizes provided a stronger blackness as well as a gloss that was higher by 10 gloss units.

What is claimed is:

1. An ink comprising:
   a glass frit milled to a particle size of 0.3-0.8 micron;
   a solvent; and
   a deflocculating or controlled flocculation dispersant, wherein the solvent is one of a group of solvents consisting of sulfur-containing solvents, chlorinated solvents, carbonate solvents and dimethyl malonate and a mixture of the above solvents.

2. The ink according to claim 1 wherein the glass frit is one of a group of glass frits consisting from a bismuth based glass frit and a zinc additive glass frit.

3. The ink according to claim 1 wherein the glass frit including particles with size of 0.3-0.8 microns reduces three fold particles sedimentation rate.

4. The ink according to claim 1 wherein the glass frit is milled in presence of a deflocculating dispersant.

5. The ink according to claim 1, wherein the solvent is one of a group or solvents with density exceeding 1.10 g/cc.

6. The ink according to claim 1 further comprising a vehicle and wherein the vehicle contains a solvent with viscosity above 10 cP in a concentration above 10 wt %, or a solvent with viscosity above 20 cP in a concentration of 5-30 wt %.

7. The ink according to claim 1 wherein the solvent with viscosity above 10 cP is selected from racemic mixture (+/−)-2,2-dimethyl-4-hydroxymethyl-1,3-dioxolane, propylene glycol, ethylene glycol, diethylene glycol, tripropylene glycol methyl ether and cyclohexanol.

8. The ink according to claims 1 wherein density of the glass frit relates to density of the solvent at least as 3.1 to 1.0.

9. The ink according to claim 1 wherein the deflocculating dispersant is one of a group of deflocculating dispersants consisting from:
   a low molecular weight unsaturated acidic polycarboxylic acid polyester with a polysiloxane copolymer
   a low molecular weight unsaturated acidic polycarboxylic acid polyester;
   a partial amide and alkylammonium salt of a low molecular weight unsaturated polycarboxylic;
   a low molecular weight unsaturated polycarboxylic acid polymer; and
   an alkyl ammonium salt of a polycarboxylic acid.

10. The ink according to claim 1 further comprising a pigment and wherein the ratio of the glass frit to the pigment is at least 1.0 to 1.0.

11. The ink according to claim 1 further comprising a pigment and wherein the pigment is one of a group of pigments consisting of Red pigments, yellow pigments, blue pigments, orange pigments, white pigments, black pigments and other pigments.

12. The ink according to claim 1 further comprising an anti-settling additive.

13. An inkjet ink comprising:
    a glass frit milled to a particle size of 0.3-0.8 micron;
    a solvent; and
    a deflocculating or controlled flocculation dispersant, wherein the ink reversibly gels upon extended standing which sedimentation of the glass frit and the ink is suitable for use in an inkjet printer, and the solvent is one of a group of solvents consisting of sulfur-containing solvents, chlorinated solvents, carbonate solvents and dimethyl malonate and a mixture of the above solvents.

14. A method of printing an image comprising:
    using an inkjet printer to print an image comprising an inkjet ink on a glass or ceramic substrate by ejecting the inkjet ink from a nozzle of an inkjet head, wherein the inkjet ink comprises:
    a glass frit milled to a particle size of 0.3-0.8 micron;
    a solvent; and
    a deflocculating or controlled flocculation dispersant, wherein the inkjet ink reversibly gels upon standing which prevents sedimentation of the glass frit, and the solvent is one of a group of solvents consisting of sulfur-containing solvents, chlorinated solvents, carbonate solvents and dimethyl malonate and a mixture of the above solvents.

15. The method according to claim 14, further comprising thermal processing of the printed image to cure the inkjet ink.

16. The ink according to claim 1 further comprising a pigment and wherein the ratio of the glass frit to the pigment is 4:1 up to 1:1.

17. The ink according to claim 14 wherein the anti-settling additive is at least one of urea (30%) derivative in N-methylpyrrolidone, urea (30%) derivative in dimethyl sulfoxide, or urea modified non-polar polyamide (30%) in isobutanol.

* * * * *